Oct. 15, 1940.  K. C. WARNE ET AL  2,217,850
PROCESS FOR THE RECOVERY OF OXYGEN FROM GASEOUS MIXTURES
Filed May 18, 1939
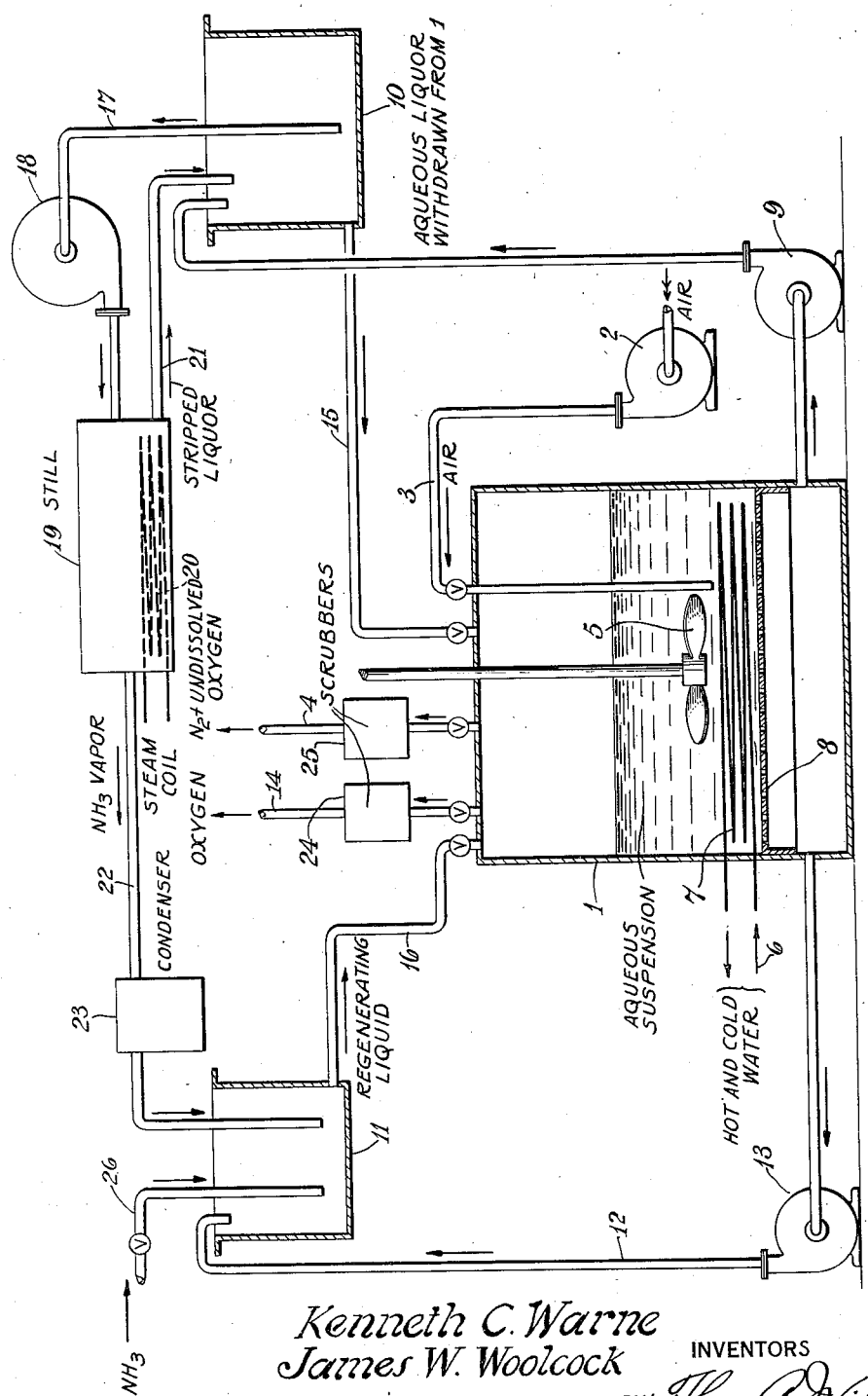
Kenneth C. Warne
James W. Woolcock   INVENTORS
BY Thos A. Wilson
ATTORNEY Patented Oct. 15, 1940

2,217,850

UNITED STATES PATENT OFFICE 2,217,850

PROCESS FOR THE RECOVERY OF OXYGEN FROM GASEOUS MIXTURES

Kenneth Cecil Warne and James William Woolcock, Norton-on-Tees, England, assignors to Imperial Chemical Industries Limited, a corporation of Great Britain Application May 18, 1939, Serial No. 274,336
In Great Britain August 23, 1937

18 Claims. (Cl. 23—221)

This invention relates to the recovery of oxygen from gaseous mixtures containing it.

It has long been known that solutions of cobaltous hexammine salts take up oxygen on exposure to air, with the formation of compounds known as ozo- or peroxo-compounds, and that a portion of the oxygen taken up is evolved when the solution is heated. The remainder of the oxygen is used up in oxidizing some of the cobaltous salt to the cobaltic state, in which state the salt is no longer capable of taking up oxygen.

Attempts have already been made to develop a commercial process for the recovery of oxygen from gaseous mixtures by repeated use and regeneration of a solution of cobaltous hexammine salt, and various soluble salts have been tried with a view to finding the most suitable one for alternately taking up and giving off oxygen. In all cases, however, it was found that a steady fall of the absorptive power of the solution occurred on repeated use, due mainly to loss of cobaltous salt by oxidation to the cobaltic state in each successive cycle. To overcome this difficulty it was suggested that the cobaltic salt should be reduced electrolytically, but it was found that owing to the low concentration of cobaltic ions in the solution the current efficiency was far too low for economic working, while if the cobaltic ion concentration were allowed to rise with a view to improving the current efficiency undesirable precipitation took place.

No simple chemical method of recovering the cobaltous salt from the cobaltic salt has been found.

This invention has as an object to devise a new process for the absorption and recovery of oxygen from oxygen-containing gases. A further object is to devise such a process wherein complex cobaltous salts are used. A still further object is to devise such a process whereby the tendency of the complex cobaltous salts to oxidize to cobaltic salts is substantially eliminated. Further objects will appear hereinafter. These objects are accomplished by the following invention.

We have found that if we use, as an absorbent for the oxygen, a complex cobalt compound which is capable of exchanging part of its complex forming radical for oxygen and vice versa, and bring about the absorption and regeneration by changing the concentration of the complex forming radical in the aqueous medium and/or by changing the partial pressure of oxygen above the aqueous medium then the oxidation of the cobaltous compounds to cobaltic can be substantially eliminated.

While it is an important feature of the invention that regeneration of the original cobaltous salt can be effected without raising the temperature, so that undesirable oxidation to the cobaltic state is minimized or eliminated, temperature variations may be used in the process of the present invention to assist in the reversal of the absorption and regeneration steps, but the temperature must always be maintained below that at which the appreciable oxidation to the cobaltic state takes place, a condition which was not possible in the known processes, in which temperature variations were relied upon for reversal of the absorption and regeneration steps. The highest permissible working temperature will, of course, depend upon the nature of the cobaltous salt and of the aqueous medium employed, e. g. with ammonia as the complex forming radical the temperature should not be raised above 35° C. In general, operation at room temperature gives good results.

Since the essence of this invention is the utilization of the equilibrium between the complex cobaltous salt and oxygen on the one side, and peroxo compound and free complex-forming radical on the other, the equilibrium should be such that it can be reached easily under operating conditions of temperature and pressure from both sides.

It will be obvious that it is desirable that the equilibrium should be capable of being reached from both sides without excessively high pressures or inconveniently high concentrations of complex-forming radical.

In order that the reaction should go to completion or substantial completion in both directions with a small change in oxygen partial pressure and/or concentration of complex-forming radical, the complex cobaltous salt or the peroxo compound, and preferably both should be largely present in the solid phase and preferably should have a sparing solubility in the aqueous medium or media, or should be capable of being made sparingly soluble by the addition of a salt having the same acid radical as the complex cobaltous salt and the peroxo compound.

The method of the present invention largely overcomes the difficulty of irreversible oxidation to the cobaltic state since it does not rely primarily upon heating to effect regeneration. Nevertheless since complex cobaltous salts vary enormously in their tendency to undergo some irreversible oxidation in the presence of aqueous media even at ordinary temperatures, it is clearly desirable to select a salt which undergoes only an extremely slight oxidation at ordinary temperatures. Complex cobaltous salts of strong acids appear to be preferable.

When using a sparingly soluble complex cobaltous compound and/or sparingly soluble peroxo compound, it is preferable to have dissolved in the aqueous medium a salt of the acid from which the complex cobaltous salt is derived, as the presence of such a salt appears to assist in preventing undesirable oxidation to the cobaltic state. The salt may conveniently be a salt of the complex-forming radical.

The most suitable salt known to us at present is cobaltous hexammine perchlorate, with aqueous ammonia, preferably containing some dissolved ammonium perchlorate, as aqueous medium. As far as our investigations have gone it appears that perchlorate compounds give the best results, and the use of these compounds in processes of the kind described is believed to be broadly novel. Under the conditions of operation cobaltous hexammine perchlorate and its peroxo compound are only sparingly soluble in the aqueous medium so that the amount of aqueous medium employed relative to the amount of solid material may vary within wide limits. In general, neither the amount nor the nature of the aqueous medium need be the same in the two stages.

In the presence of the aqueous medium, the complex cobaltous salt and its peroxo compound will usually tend to decompose with liberation of one or more molecules of the complex-forming radical, e. g. ammonia. Such decomposition may be prevented, however, by having ammonia or other complex-forming radical dissolved in the aqueous medium.

It is also an advantage to employ vigorous stirring in the absorption stage especially when the complex cobaltous compound is sparingly soluble, and in the regeneration stage especially when the peroxo compound is sparingly soluble.

We have also found that the presence of one or more polyhydric alcohols, e. g. ethylene glycol in the aqueous medium or media used in regeneration increases the rate of regeneration.

Increase of the concentration of complex-forming radical in the aqueous medium for the purpose of regeneration may be effected in any convenient manner. For example, when both the complex cobaltous salt and its peroxo compound are sparingly soluble in the aqueous media employed, the absorption stage may be carried out with the solid complex cobaltous salt in contact with a quantity of medium relatively poor in the complex-forming radical, and regeneration then obtained by replacing the said medium by a quantity of medium relatively rich in the complex-forming radical. During the absorption stage the complex cobaltous salt rejects some complex-forming radical to the medium in contact with it, while during the regeneration stage the peroxo-compound takes up some complex-forming radical from the medium in contact with it. Thus, in effect, complex-forming radical is transferred from the regeneration stage medium to the absorption stage medium by the complex cobaltous salt and its peroxo compound, and to enable the medium to be repeatedly used some complex-forming radical has to be removed from the absorption stage medium and fresh complex-forming radical introduced into the regeneration stage medium, after each cycle or at convenient intervals. Complex-forming radical may be returned from the absorption stage medium to the regeneration stage medium by any suitable method, and fresh complex-forming radical may be added to make up for any losses in the process. Any complex-forming radical contained in the gases leaving the process may be recovered and returned to the absorption or regeneration stage medium.

It will be understood that in the absorption stage the invention is not confined to the use of one aqueous medium, and that a series of aqueous media of different complex-forming radical concentrations may be used. Similarly, in the regeneration stage instead of one aqueous medium, a series of aqueous media may be employed.

The absorption and regeneration stage media may with advantage contain a compound which buffers the concentration of the complex-forming radical in these media. It is thereby rendered possible to use a lower ratio of medium to suspended cobaltous complex compound or peroxo compound since the presence of the buffer in the absorption stage medium prevents an undesirable rise in concentration of the free complex-forming radical, which would slow down substantially the rate of absorption, while in the regeneration stage medium, the presence of the buffer would prevent undesirable decrease in the concentration of the free complex-forming radical, which would slow down substantially the rate of regeneration.

In addition, the presence of a buffer for the complex-forming radical in the absorption stage medium renders it possible to obtain more easily a transfer of the free complex-forming radical which accumulates in the absorption stage medium back to the regeneration stage medium. This is particularly advantageous when distillation is employed to effect the transfer, since the loose compounds of the buffer and complex-forming radical dissociate and increase the concentration of free complex-forming radical in the aqueous medium, thereby giving a higher ratio of complex-forming radical to water in the distillate.

The variation in concentration of complex-forming radical may also be obtained otherwise than by the physical transference of quantities of media. One aqueous medium may be used for both absorption and regeneration stages. In this case, ammonia or other gaseous or vaporised complex-forming radical may be introduced into or removed from the aqueous medium as a gas, or the aqueous medium may contain a substance or substances capable of giving rise to change of concentration of complex-forming radical under the conditions of working. Thus a hydrolysable ammonium salt may be present which on hydrolysis (favoured by raising the temperature or otherwise) gives rise to an insoluble or substantially un-ionised acid or a volatile acid which can be removed from the aqueous medium, with the result that the concentration of free ammonia in the aqueous medium may be increased or decreased at will.

Ammonium borate is an example of a soluble salt which has a high coefficient of hydrolysis in the permissible working range of temperature. It is possible to get an even greater change in free ammonia concentration over a small range of temperature by taking advantage of the high temperature coefficient of solubility of lithium metaborate octahydrate used in conjunction with an ammonium salt of a strong acid, for example, ammonium sulphate. At lower temperatures the tendency is for lithium metaborate octahydrate to be present as a solid, and the free ammonia concentration in the aqueous medium to be low, since the ammonium salt of a strong acid is not appreciably hydrolysed. At the higher temperatures when the lithium metaborate goes into solution, the free ammonia concentration increases owing to the hydrolysis of the weakly ionised ammonium borate which tends to be formed. On cooling down the process is reversed.

The cooling should be carried out so that the lithium metaborate octahydrate which thereby crystallises out cannot occlude any particles of the cobaltous hexammine compound or the peroxo compound.

The process may be further modified by choosing an acid radical such that the solubility of its lithium compound does not increase rapidly with temperature. It is then possible by suitable choice of aqueous medium and concentrations to crystallise out the lithium salt of the strong acid at the higher temperature with a view to obtaining an even greater change of free ammonia concentration over a limited temperature range.

Salts which give rise to ammonia or other complex-forming radical on heating may also be employed to produce variations of concentration of complex-forming radical in the aqueous medium. Another possibility is to have present a basic ammonium salt or compound the concentration of which in solution changes rapidly with temperature.

The extent of the variation in concentration of complex-forming radical in the aqueous medium required in the process depends upon several factors, including temperature, oxygen partial pressure, and the nature of the complex cobaltous salt, its peroxo compound and the aqueous medium or media, and the rate of reaction desired, but the variation for any given set of operating conditions can easily be determined by ordinary experiments.

The invention is illustrated in the following example which refers to the accompanying drawing.

*Example*

The aqueous suspension employed was made by mixing 61 parts by weight of cobaltous perchlorate hexahydrate ($Co(ClO_4)_2.6H_2O$) with an aqueous solution containing 39 parts by weight of ammonium perchlorate ($NH_4ClO_4$), 17.14 parts by weight of ammonia and 400 parts by weight of water. Cobalt hexammine perchlorate was precipitated as a pink solid and the liquid contained ammonium perchlorate and a small concentration of free ammonia, about .2 normality.

The aqueous suspension was placed in a closed vessel 1 and carbon dioxide-free air was passed by means of a blower 2 and pipe 3 through it, the nitrogen and undissolved oxygen being allowed to escape through a pipe 4 any ammonia carried away by it, being scrubbed out in the scrubber 25. The contents of the vessel 1 were stirred by means of a stirrer 5 and prevented from rising in temperature above 30° C. by passing cold water as required from the pipe 6 through the coil 7. The pressure in the apparatus through the whole operation was maintained at substantially atmospheric. After 20.9 parts by weight of air had been passed, the absorption of oxygen became very slow and 2.4 parts by weight of oxygen had been absorbed.

The liquid was then withdrawn from the bottom of the vessel 1 through the porous bottom 8 by means of a pump 9, and pumped to the vessel 10. The porous bottom ensured that only liquid was withdrawn, the solid dark brown to black peroxo compound into which the pink cobalt hexammine perchlorate had changed being retained in the vessel.

For the regeneration of the oxygen from the peroxo compound an aqueous solution containing 39 parts by weight of ammonium perchlorate, 27.2 parts by weight of ammonia and 400 parts by weight of water was run into the vessel 1 from the tank 11, through the pipe 16. The resulting suspension of the peroxo compound was then vigorously stirred when oxygen was evolved and collected via the pipe 14, the valves on both pipes 3 and 4 being closed. Any ammonia in the evolved oxygen was scrubbed out by the scrubber 24. The stirring was continued until 2.4 parts by weight of oxygen had been evolved and the peroxo compound had been completely converted to the pink cobalt hexammine perchlorate. During regeneration of oxygen heat was absorbed and hot water was passed through the coil 7 by the pipe 6 to maintain the temperature of the contents of the vessel 1 just below 30° C.

When regeneration of oxygen was complete the liquid in the vessel 1 was withdrawn through the false bottom 8 by means of the pump 13 and returned to the vessel 11.

The absorption cycle was then repeated by returning the liquor from the tank 10 to the vessel 1 by the pipe 15 and after completion of the absorption process, the liquor was again withdrawn and returned to the vessel 10 and replaced by the liquor in the vessel 11, when regeneration of the oxygen was again effected.

Since ammonia was transferred from the cobaltous hexammine perchlorate to the liquor during the oxygen absorption process and from the liquor to the peroxo compound during the oxygen regeneration, the weak ammonia solution stored in the tank 10 became stronger and the strong ammonia solution stored in the tank 11 became weaker in ammonia. In order to maintain the liquor at about the desired strength, some of the liquor in the tank 10 was pumped via pipe 17 and pump 18 through a still 19 heated by a steam coil 20. The resulting ammonia vapour and steam was passed through pipe 22 to a condenser 23 and into the tank 11, while the stripped liquor from the still 19 was returned via pipe 21 to the tank 10. Additional ammonia was added as required, to make up for losses, through the pipe 26 into the tank 11.

Further useful complex cobaltous salts are cobalt hexammine chloride, fluoride, bromide, acetate and nitrate. Instead of the ammonia we could have used other complex-forming radicals such as aniline, toluidine, methylamine, triethanolamine, ethylene diamine, pyridine and ethanolamine, and instead of using water as a liquid medium we could have used methyl alcohol, ethyl alcohol, glycol or formamide.

The process of the present invention is of particular value in recovering oxygen from air, but it may also be applied to other oxygen-containing gaseous mixtures provided that gases which are deleterious to the absorbent are either absent or are removed prior to the absorption process.

As many apparently widely different embodiments of this invention may made without departing from the spirit and scope thereof, it is to be understood that the invention is not limited to the specific embodiments thereof except as defined in the appended claims.

We claim:

1. A process for the recovery of oxygen from gaseous mixtures containing it, which comprises the employment, as absorbent for the oxygen, of a complex cobaltous perchlorate capable of exchanging part of its complex-forming radical for oxygen and vice versa, in association with at least one aqueous medium the absorption and regeneration being effected below the temperature at which the cobaltous perchlorate will be oxidised to a cobaltic perchlorate in any substantial quantity.

2. A process as claimed in claim 1, in which the absorption is effected by increasing the partial pressure of the oxygen above the aqueous medium and regeneration is effected by decreasing the partial pressure of the oxygen above said medium.

3. A process as claimed in claim 1, in which the absorption is effected in the presence of at least one aquous medium relatively weak in free complex-forming radical, and regeneration is effected by increasing the concentration of free complex-forming radical in said aqueous medium.

4. A process as claimed in claim 1 in which the complex cobaltous perchlorate is largely present in the solid phase.

5. A process as claimed in claim 1, in which the complex cobaltous perchlorate is changed to a cobaltous peroxo compound during the absorption step, said peroxo compound being largely present in the solid phase.

6. A process as claimed in claim 1 in which the complex cobaltous perchlorate is sparingly soluble in the aqueous medium.

7. A process as claimed in claim 1, in which complex cobaltous perchlorate is converted to a cobaltous peroxo compound which is sparingly soluble in the aqueous medium.

8. A process as claimed in claim 1 in which the complex cobaltous perchlorate is cobaltous hexammine perchlorate.

9. A process as claimed in claim 1 in which the aqueous medium contains a soluble perchlorate.

10. A process as claimed in claim 1 in which the aqueous medium contains a buffer for the complex-forming radical.

11. A process as claimed in claim 1 in which the absorption is effected in the presence of at least one aqueous medium relatively weak in free complex-forming radical, and regeneration is effected by replacing the aqueous medium with one stronger in free complex-forming radical.

12. A process as claimed in claim 1, in which the absorption and regeneration is controlled by raising the concentration of free complex-forming radical in the aqueous medium after the absorption step to effect regeneration, said increase in concentration being effected by having present a compound capable of giving rise to an increase in the concentration of free complex-forming radical with increase in temperature, and increasing said temperature to bring about said effect.

13. A process as claimed in claim 1, in which the absorption and regeneration is controlled by raising the concentration of free complex-forming radical in the aqueous medium, a hydrolysable salt of the complex-forming radical with an acid which can easily be removed from the aqueous medium and which salt is capable of giving rise to increases in the concentration of free complex-forming radical with increases in temperature, and raising said temperature to obtain the required concentration of free complex forming radical.

14. A process as claimed in claim 1 in which the complex-forming radical is ammonia and in which the absorption and regeneration is controlled by varying the concentration of free ammonia in the aqueous medium such variation being effected by having ammonium borate present in the aqueous medium and varying the temperature.

15. A process as claimed in claim 1 in which the complex-forming radical is ammonia and in which the absorption and regeneration is controlled by varying the concentration of free ammonia in the aqueous medium such variation being effected by having lithium metaborate octahydrate present in the solid phase and a soluble ammonium salt present in the aqueous medium and varying the temperature.

16. A process as claimed in claim 1 in which the complex-forming radical is ammonia and the absorption and regeneration is effected below 35° C.

17. A process as claimed in claim 1 in which the rate of regeneration is increased by the presence of a polyhydric alcohol in the aqueous medium.

18. A process as claimed in claim 1 in which the rate of regeneration is increased by the presence of ethylene glycol in the aqueous medium.

KENNETH CECIL WARNE.
JAMES WILLIAM WOOLCOCK.